United States Patent [19]

Larson

[11] 4,041,576

[45] Aug. 16, 1977

[54] ATTACHMENT DEVICE

[76] Inventor: Carl T. Larson, P.O. Box 54, Richmond, Calif. 94807

[21] Appl. No.: 518,559

[22] Filed: Oct. 29, 1974

Related U.S. Application Data

[60] Division of Ser. No. 316,959, Dec. 20, 1972, Pat. No. 3,858,281, which is a continuation-in-part of Ser. No. 77,164, Oct. 1, 1970, abandoned.

[51] Int. Cl.² .............................................. A44B 9/10
[52] U.S. Cl. ................................................... 24/156
[58] Field of Search ..................... 24/161 A, 156, 157, 24/248 SA, 248 SB, 252 AT, 252 LH, 232, 233, 234, 156 R

[56] References Cited

U.S. PATENT DOCUMENTS

| 344,092 | 6/1886 | Elliott | 24/234 X |
|---|---|---|---|
| 1,363,516 | 12/1920 | Kuhl | 24/232 |
| 1,963,446 | 6/1934 | Peters | 24/161 A |
| 2,692,415 | 10/1954 | Forde | 24/156 R |
| 3,135,035 | 6/1964 | Jenison | 24/161 A |
| 3,496,614 | 2/1970 | McGarry | 24/156 R |
| 3,744,099 | 7/1973 | McCoy | 24/156 R |

FOREIGN PATENT DOCUMENTS

| 557,426 | 5/1923 | France | 24/234 |

Primary Examiner—Donald A. Griffin
Attorney, Agent, or Firm—Townsend & Townsend

[57] ABSTRACT

A device having an elongated member, a head having a passage for receiving one end of the member and means coupling the head with the opposite end of the member with the latter being movable into and out of the head. The head has improved means to releasably lock the end of the member therein, such means including a pair of relatively shiftable members normally in engagement with each other and movable apart to present an access passage therebetween. A number of embodiments of the device are disclosed.

7 Claims, 14 Drawing Figures

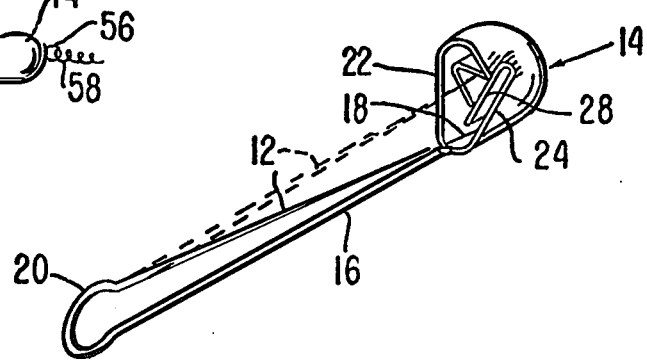
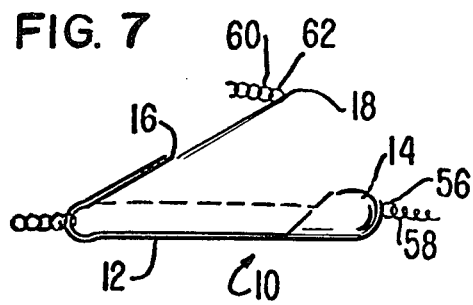
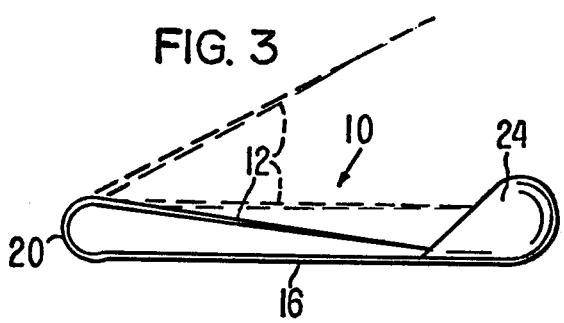
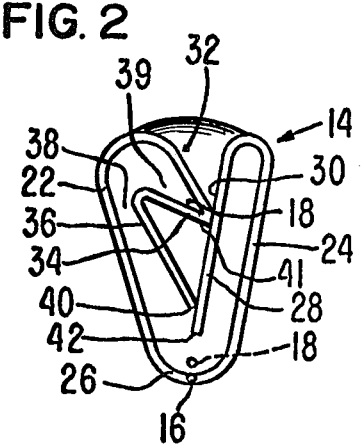
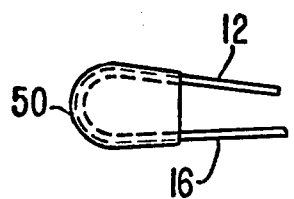
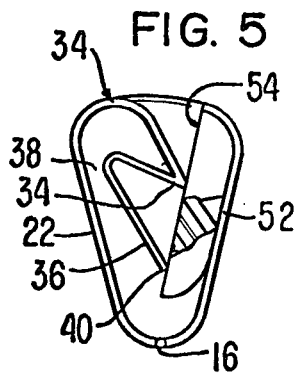
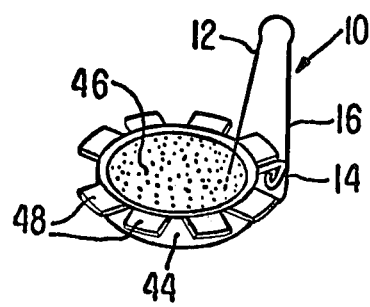

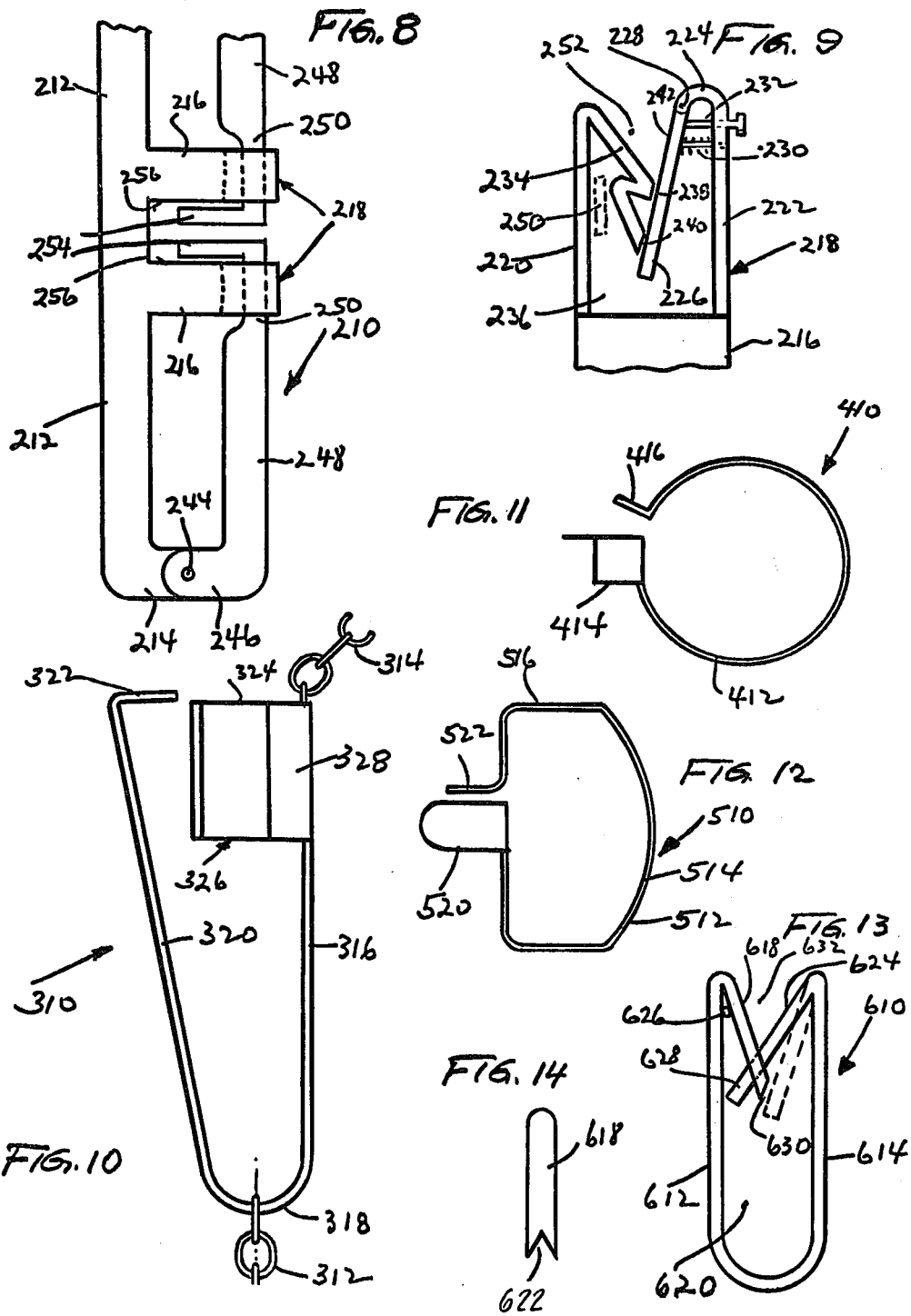

ATTACHMENT DEVICE

This is a division, of application Ser. No. 316,959, filed Dec. 20, 1972, now U.S. Pat. No. 3,858,281, issued Jan. 7, 1975, application Ser. No. 316,959 having been a continuation-in-part application of U.S. application Ser. No. 77,164 filed Oct. 1, 1970, now abandoned.

This invention relates to improvements in mechanical connectors for coupling various things together and, more particularly, to a closable attachment device which has improved safety features.

The present invention is suitable for use in a number of different applications. For instance, it is especially suitable for use as a device which can replace the conventional safety pin. As is well-known, the conventional safety pin has a number of drawbacks, foremost of which is the fact that its pointed shank or pin member is normally biased in an open position. Thus, if the pin is swallowed when open, it can easily cause injury to the stomach, and surgery is required to remove the open safety pin to prevent further internal injuries.

Another drawback of the conventional safety pin is that it must be pushed into a closed position and, while force necessary to do this is generally not excessive, it is inconvenient for the user to oftentimes probe for the pinhead to force the pin itself into the proper pinhead groove. This is all the more difficult if the fabric or other material to be pinned is relatively thick and fills the space between the pin member and the adjacent shank which carries the pinhead.

The present invention provides an improvement over conventional connectors or attachment devices by providing an attachment device having an elongated member which cooperates with a head in the manner such that the member is biased into a particular position, such as a closed position, within the head. The member could also be biased into an intermediate position or into a position extending outwardly and away from the head. In the alternative, the member need have no bias force exerted thereon.

The configuration of the head itself is such that, once the member is received therewith, the member can be moved further within the head to a locked location and cannot be moved out of such location unless the member is caused to follow a tortuous path through the interior of the head. Thus, the device of this invention cannot be accidentally opened; it remains closed at all times until the member is actually forced out of the head itself. Moreover, the member cannot be pushed out of the head until it is properly aligned with a passage which is normally closed by a yieldable element. This, this invention has, in addition to its normally closed features, other safety features which make it vastly more suitable for use than conventional devices, especially conventional safety pins.

The attachment device of this invention can be made simply and inexpensively and can be made in volume to keep production costs at a minimum. It is also adaptable for a number of different applications, including use as a jewelry clasp, as a heavy cable connector, or as a simple key ring.

The primary object of this invention is, therefore, to provide an improved attachment device which has safety features thereon which keep a shiftable member releasably locked to a head until the member is moved along a specific path through the head to thereby prevent accidental opening of the device.

Another object of this invention is to provide an attachment device of the type described wherein the device includes a head having a normally closed passage for receiving the member into the head and further provided with an additional safety feature which includes structure for releasably locking the member in a fixed position within the head remote from its normal location in the head to thereby require the member to be first manually moved from the locked position to such normal location from which it can then be moved out of the head.

Another object of this invention is to provide an attachment device of the aforesaid character wherein the device can be constructed for a wide variety of uses, yet the safety features inherent in its construction can be realized regardless of the use to which it is put.

Other objects of this invention will become apparent as the following specification progresses, reference being had to the accompanying drawing for an illustration of several embodiments of the invention.

In the drawings:

FIG. 1 is a perspective view of one embodiment of the attachment device of this invention as used as a safety pin;

FIG. 2 is an enlarged and elevational view of the head of the device of FIG. 1;

FIG. 3 is a side elevational view thereof;

FIG. 4 is a fragmentary side elevational view of one end of the device of FIG. 1, showing a modification thereof;

FIG. 5 is a view similar to FIG. 2, but showing another modification thereof;

FIG. 6 is a perspective view of the device of FIG. 1 when used with a holder for keeping the pin member thereof in an open position;

FIG. 7 is a side elevational view of the device of FIG. 1 used as a clasp for a jewelry piece, such as a necklace;

FIG. 8 is a side elevational view of a portion of another type of attachment device of this invention, showing a pair of attachment sections for connecting cables, chains or the like;

FIG. 9 is an enlarged, fragmentary, end elevational view of one of the heads of the device of FIG. 8;

FIG. 10 is a view similar to FIG. 8 but showing a fourth embodiment of the attachment device;

FIG. 11 and FIG. 12 are side elevational views of attachment devices made in accordance with the present invention but adapted for use as key rings;

FIG. 13 is an enlarged, end elevational view of a modified head for the embodiments of the attachment device; and FIG. 14 is a side elevational view of a part of the head of FIG. 13.

One form of the attachment device of this invention is shown in FIGS. 1-7 and broadly denoted by the numeral 10. Device 10 is constructed to present a safety pin suitable for a number of uses such as for connecting the ends of a diaper together. Device 10 includes a pin member 12, a head 14 and a shank 16 interconnecting pin member 12 and head 14 in the manner shown in FIGS. 1 and 3. Pin member 12 has a pointed end 18 which is adapted to be inserted through material that can be pierced, such as diaper fabric or the like. The opposite end of the pin member is coupled by a coil spring 20 to the proximal end of shank 16. The shank is secured at the opposite end to head 14 and the shank is relatively rigid so that it projects laterally from the head.

Head 14 has a pair of spaced sides 22 and 24 which converge toward each other and are connected by an arcuate end 26 (FIG. 2). A leaf spring 28 having a flat surface 30 is secured to the opposite end of side 24 and is generally parallel therewith, the inner end edge 42 of spring 28 terminating in spaced relationship to end 26, as shown in FIG. 2.

An irregularly shaped member 32 is secured to the end of side 22, remote from end 26 and includes a V-shaped portion 34 and a straight portion 36 rigid to one side of portion 34. Portion 36 is spaced inwardly from side 22 to form a passage 38 having one end which communicates with an open groove 39 defined by V-shaped portion 34. Passage 38 terminates at the opposite end thereof near end 26.

Straight portion 36 forms an acute angle with spring 28 and has an end edge 40 which normally abuts surface 30 of spring 28 in spaced relationship to end edge 42 thereof. V-shaped portion 34 is inclined relative to face 30 so that its base 41 normally abuts surface 30 at a location thereon spaced from end edge 40.

Spring 28 and member 32 form a second passage which is normally closed due to the engagement of end edge 40 and base 41 with surface 30 but which can be opened by urging spring 28 away from end edge 40 and base 41. This second passage allows end 18 of pin member 12 to move into and out of head 14.

Shank 16 is secured to end 26 and extends laterally therefrom. Pin member 12, shank 16 and spring 20 are generally in a plane which is substantially parallel with or coincides with the plane of the aforesaid second passage. In the alternative, the plane in which pin member 12, shank 16 and coil spring 20 are disposed can be at a slight angle relative to the plane in which the second passage is disposed.

Coil spring 20 biases pin member 12 toward shank 16 and into the dashed line position within head 14 as shown in FIG. 2. Spring 28 and the outer side of V-shaped portion 34 define a V-shaped region for guiding the pin member into the head and into alignment with the aforesaid second passage.

Spring 20 could also be constructed so as to bias pin member 12 outwardly of and away from shank 16 or into an intermediate position between the outwardly and inwardly extending positions. In the intermediate position, the pointed end of the pin member would normally be in the V-shaped outer recess between spring 28 and member 32.

When it is desired to releasably lock the pin member in a fixed position with respect to the head, pointed end 18 is urged through passage 38 from the dashed line position of FIG. 2 until end 18 is aligned with groove 39. Then the pin member can be released, whereupon it will automatically move into the groove and be retained at its inner end. The movement of end 18 is reversed to return it to its dashed line position at which it is generally aligned with the aforesaid second passage for movement out of the head.

Head 14 is rounded and has smooth outer surface contours to make it free of obstructions. Also, the head is open only in the top region through which pointed end 18 passes, the rest of the top being essentially closed (FIG. 1).

In use, the attachment pin is initially in the position in FIG. 1 with the pin member 12 converging toward shank 16. In the alternative, pin member can initially be in a position with end 18 in the groove formed by V-shaped portion 34.

Assuming the pin member is in the FIG. 1 position, the pin member is forced away from shank 16 and against surface 30 of spring 28 to urge the latter toward side 24 and away from end edge 40. End 18 can then pass between surface 30 and end edge 40 and move into the region between end edge 40 and base 41. Continued movement of end 18 along surface 30 away from end edge 40 causes spring 28 to again move toward side 24 and open the corresponding portion of the aforesaid second passage to allow end 18 to continue past base 41. The pin member can then be moved away from head 14 and inserted into a material such as a fabric for attaching the fabric to another article. As soon as the attachment has been completed, end 18 is released and immediately and automatically moves into the V-shaped region defined by surface 30 and the adjacent side of V-shaped portion 34. The spring bias on pin member 12 forces spring 28 to the right when viewing FIG. 2 so that the end 18 can pass base 41. As end 18 continues further inwardly of the head, it reaches end edge 40 and urges spring 28 again to the right, thereby allowing end 18 to move into the dashed line position of FIG. 2. Thus, when end 18 moves into or out of head 14, the aforesaid second passage only partially opens depending upon where end 18 is located along surface 30.

End 18 can then be shifted manually through passage 38 and then to the right and released so that it can fall into the groove 39 and be retained therein so that pin member 12 will be releasably locked within the head itself.

Attachment pin 10 can be made of any suitable material, such as metal or the like. Also, all metal parts can be coated with a suitable plastic, such as Teflon so that pin 10 will be lubricated to pass through a person such as a baby, in the event that the pin is swallowed.

The space between V-shaped portion 34 and end edge 40 along surface 30 provides an intermediate locked position for the pin member so that end 18 must pass both end edge 40 and portion 34 before it can emerge from the head. This provides an additional safety feature for pin 10.

A suitable device for holding the pin in an open position is shown in FIG. 6 wherein a support 44 has a material 46 thereon which can be pierced by pointed end 18. A number of spaced, laterally projecting elements 48 on the outer periphery of support 44 present regions for receiving head 14 in the manner shown in FIG. 6, when end 18 pierces material 46. Thus, the pin can be forced into the material and then shank 16 is moved away from the pin toward a pair of elements 48. Finally, the pin is further moved into the material to force the head between the two elements 48, thereby holding the pin in an open position. A person can easily pick the pin up using the thumb and index finger to hold pin member 12 away from shank 16. The pin member can then be inserted into a fabric or other material for attachment purposes. Release of the pin once again causes pin member 12 to move automatically into the head and into the dashed line position shown in FIG. 2.

It is possible to cover or coat coil spring 20 with a suitable resilient material or device to assure that there will always be sufficient tension to close pin 10 automatically and keep it secure in its internally locked position. Such a cover or coat would stay in place on pin 10 as it would fill the loop of spring 20. Also, coil spring 20, could be replaced by a block of plastic material 50 (FIG. 4) which receives the ends of pin member 12 and shank 16, the manner such that pin member 12 would be biased toward shank 16. Material 50 would then provide the spring action which would always return pin member 12 to the position at which it is biased in the head.

Head 14 can be made in any suitable manner. For instance, it can be of a one-piece construction as shown in the drawing by forming it from a strip of generally rigid, bendable material or by casting it from a metallic or plastic material. Such material is bent into the shape shown in FIG. 2. Also, the maximum transverse dimension between sides 22 and 24 can be relatively small to minimize the size of the pin. FIG. 2 illustrates head 14 in a somewhat exaggerated form for the purpose of showing details of construction. Head 14 need not be made as wide as it is shown in FIG. 2.

Another embodiment of the pin is shown in FIG. 5 and is substantially the same as that shown in FIGS. 1 - 3 except that spring 28 is replaced by a mass 52 of resilient material such as plastic, neoprene, nylon or the like. Mass 52 has a flat surface 54 along which pin end 18 moves as it is shifted into and out of the head.

Attachment pin 10 can be used as a necklace or other jewelry clasp in the manner shown in FIG. 7. In this case, head 14 will have a small ring 56 secured to it so that one end 58 of the jewelry piece, for instance, a necklace, can be secured to the head. End 58 is secured to ring 56 and the opposite end 60 of the jewelry piece has a ring 62 which is placed on pin member 16 and, when the jewelry piece is worn, the portion adjacent to end 60 projects outwardly from spring 20 as shown in dashed lines in FIG. 7. End 18 of pin member 16 will be blunt since it does not have to pierce fabric material.

In use, the embodiment of FIG. 7 initially has end 58 of the jewelry piece connected to head 14 thereof. Since pin member 16 is normally closed, it will be necessary to open the pin by forcibly urging end 18 of pin member 16 away from head 14. While pin member 16 is in its open position, shown in full lines in FIG. 7, ring 62 can be placed on end 18, then, pin member 16 can be released, causing it to move to its closed position with end 18 within head 14. End 18 can then be moved to the locked position shown in dashed lines in FIG. 1. Shank 12 and pin member 16 can be curved, if desired, to fit certain body parts, such as the neck or wrist.

Another form of the attachment device of this invention is broadly denoted by the numeral 210 and is shown in FIGS. 8 and 9. Device 210 can be of any size and can be sufficiently large so that it can be used to interconnect heavy cables or sufficiently small so that it can be used to interconnect jewelry chains. The size of device 210 is, therefore, dependent only upon the application to which it is to be put. It can be of metal, plastic or other suitable material.

Device 210 has a rigid bar 212 provided with a pair of laterally extending end legs 214, only one of which is shown in FIG. 1. A pair of spaced, central legs 216 are integral with bar 212. Legs 216 project laterally from bar 212 in the same direction as legs 214. Legs 216 are parallel to and longer than legs 214.

The outer end of each leg 216 is provided with a head 218 having locking means thereon and whose cross section is substantially the same as that shown in FIG. 2. To this end, each head 218 has a pair of relatively shiftable elements normally in engagement with each other but movable apart to permit a pin or attachment unit to pass therebetween so as to become lodged in a confined space within the head. Head 218 for each leg 216 is of the type shown in FIG. 9, wherein the head comprises a pair of opposed, generally parallel flat sides 220 and 222, side 222 being transversely J-shaped to present an outer curved end portion 224 to which a flat element 226 is coupled. For purposes of illustration, element 226 is pivotally mounted by a pin 228 to the outer end of portion 224 and a coil spring 230 carried between side 222 and element 226 biases the latter in a clockwise sense when viewing FIG. 9. An adjustment screw 232 can be used as a stop to limit counterclockwise movement of element 226 relative to side 222.

Side 220 has an irregularly shaped element 234 integral therewith extending inwardly with respect to inner space 236 of head 218 and toward element 226. Element 234 has a pair of spaced projections defining respective flat surfaces 238 and 240 which are normally engaged by the adjacent flat outer surface 242 of element 226 when the latter is in the full line position of FIG. 9. Screw 232 can be used to releasably hold element 226 in engagement with surfaces 238 and 240, once device 210 is in an operable condition.

Each leg 214 is pivotally coupled by a pin 244 to one leg 246 of a respective, elongated member 248 which extends from the corresponding leg 214 to the corresponding head 218. Each member 248 has an end portion 250 of reduced width which is adapted to pass into the V-shaped region 252 (FIG. 9) between elements 226 and 234 and then into space 236 past surfaces 238, 240 and 242. Once portion 250 is in space 236, it will normally assume the dashed line position of FIG. 7 in the V-shaped recess formed by side 220 and element 234. After portion 250 is in space 236, spring 230 will return element 226 into engagement with surfaces 238 and 240. Screw 232 can then be rotated so that element 226 cannot back off from surfaces 238 and 240, thereby locking portion 250 in space 236.

The loop formed by bar 212 and each member 248 can be used to hold an end link of a chain or a link on the end of a cable. The opposite end of device 210 can be used in the same manner. A unique feature of device 210 is in the provision of a lip 254 on the outer end of each member 248 which is adapted to be positioned adjacent to the flat end surface 256 of the corresponding leg 216, the latter generally being solid in construction. This will tend to give strength to the device where heavy loads are applied since there is a tendency for the load to pull outwardly of legs 214 and 246 and the corresponding lip 254 will abut the corresponding surface 256, thereby minimizing the load on one end of the device.

This same feature can be used with an attachment device 310 of the type shown in FIG. 10 for interconnecting a pair of chains 312 and 314. To this end, bar 316 is integral with a pin member 320 by means of a curved spring portion 318. Pin member 320 has a lateral end portion 322 adapted to abut the end face 324 of a head 326 whose cross section is substantially the same as that shown in FIG. 2. Head 326 is connected by a leg 328 to the adjacent end of bar 316. Portion 322 prevents distortion of device 310 when a heavy pull on chain 312 is encountered.

FIGS. 11 and 12 show several different types of key rings that can be formed utilizing the teachings of the present invention. FIG. 9 shows an attachment device 410 having a ring-like body 412 which is provided with a pair of opposed ends. A head 414 is secured to one end of body 412 and a lateral projection 416 is integral with the opposite end of the body. Head 414 is substantially of the same construction as the head shown in FIG. 2. Body 412 is releasably coupled by moving projection 416 into head 414 in the manner described above with respect to the other embodiments of the invention. Keys or other items can be moved onto and off body 412 when projection 416 is in the open position shown in FIG. 11.

FIG. 12 shows an attachment device 510 similar in all respects to device 410 except for the shape of body 512 which has a curved portion 514 and a pair of L-shaped side portions 516 and 518. A head 520 of substantially the same construction as the head of FIG. 2 is secured to the outer end of side portion 518. A lateral projection 522 is on the outer end of side portion 516. Projection 522 is adapted to be moved into and out of the interior of head 520, whereby keys or other items on body 512 can be releasably locked or be rendered removable from the body as desired.

A further embodiment of the head for use with the various embodiments described above is shown in FIGS. 13 and 14 and is denoted by the numberal 610. Head 610 has a pair of opposed, flat, generally parallel sides 612 and 614 connected together by a curved portion 616 so that the head has a U-shaped configuration. Side 612 has an element 618 integral therewith and extending into space 620 between sides 612 and 614. Element 618 is inclined with respect to side 612. The inner end of element 618 has a V-shaped notch 622 as shown in FIG. 14.

Side 614 has an element 624 integral therewith and inclined relative thereto. Element 624 has a cross section permitting it to enter and be lodged within notch 622 as shown in full lines in FIG. 11. Element 624 is resiliently connected to side 614 so that it can be sprung back and into the dashed line position shown in FIG. 11 when it is desired to allow an elongated pin member 626 to enter and leave space 620. For purposes of illustration, pin member 626 is shown in the V-shaped region between side 612 and element 618, whereby the pin member is locked in place within head 610.

To remove the pin member from the space 620, the pin member is forced downwardly against the innermost end 628 of element 624, causing the element to be moved into the dashed line position of FIG. 13, thereby forming an opening 630 between elements 618 and 624 to thereby permit pin member 626 to move out of space 620 and into the V-shaped region 632 between elements 618 and 624. It will be understood, of course, that head 610 is coupled to one end of a bar, such as bar 316 of FIG. 10 and that pin member 626 is coupled to the bar in some suitable manner, such as by a curved portion similar or equivalent to portion 318 of FIG. 10.

I claim:

1. An attachment device comprising: an elongated member; a bar; means interconnecting one end of the member and one end of the bar and permitting said member to be moved toward and away from the bar; a head having a pair of spaced sides and being secured to the opposite end of the bar, said head having a passage thereinto for permitting the opposite end of the member to move into said head, said passage having an entrance; and a pair of relatively shiftable elements extending into the head from respective sides and between the latter, one of the elements having a pair of spaced extremities thereon, the other element having a surface and being biased into engagement with the extremities of said one element for yieldable closing said passage.

2. An attachment device as set forth in claim 1, wherein said interconnecting means includes a spring.

3. An attachment device as set forth in claim 1, wherein said interconnecting means includes a pivot pin.

4. An attachment device as set forth in claim 1, wherein said one other element is pivotally connected to the respective side, and including a spring normally engaging said one other element and biasing the same toward said other element extremities.

5. An attachment device as set forth in claim 4, wherein is included a stop adjustably carried by said head and disposed to limit the movement of said one other element away from said other element.

6. An attachment device comprising: an elongated member; a bar; means interconnecting one end of the member and one end of the bar and permitting said member to be moved toward and away from the bar; a head having a pair of spaced sides and being secured to the opposite end of the bar, said head having a passage thereinto for permitting the opposite end of the member to move into said head, said passage having an entrance, said head further having an end face, said member having a lateral projection on the opposite end thereof, said projection being contiguous to said end face externally of the head and capable of abutting said end face; and a pair of relatively shiftable elements extending into the head from respective sides and between the latter, one of the elements being biased into engagement with the other element for yieldably closing said passage.

7. An attachment device comprising: an elongated member; a bar; means interconnecting one end of the member and one end of the bar and permitting said member to be moved toward and away from the bar; a head having a pair of spaced sides and being secured to the opposite end of the bar, said head having a passage thereinto for permitting the opposite end of the member to move into said head, said passage having an entrance; and a pair of relatively shiftable elements extending into the head from respective sides and between the latter, one of the elements being an abutment having a recess in the outer end thereof, the other element including spring structure coupled to the other side and normally biased toward, received within and extending through said recess, said structure being movable out of the recess and away from said abutment to open said passage.

* * * * *